(12) United States Patent
Do

(10) Patent No.: US 9,723,942 B2
(45) Date of Patent: Aug. 8, 2017

(54) BREWING AND FILTERING DEVICE FOR COFFEE AND TEA

(71) Applicant: Palm Coffeemaker LLC, Miami, FL (US)

(72) Inventor: Jessica Do, Miami, FL (US)

(*) Notice: Subject to any disclaimer, the term of this patent is extended or adjusted under 35 U.S.C. 154(b) by 127 days.

(21) Appl. No.: 14/746,232

(22) Filed: Jun. 22, 2015

(65) Prior Publication Data

US 2015/0366395 A1    Dec. 24, 2015

Related U.S. Application Data

(60) Provisional application No. 62/015,415, filed on Jun. 21, 2014.

(51) Int. Cl.
| | |
|---|---|
| *A47J 31/06* | (2006.01) |
| *A47J 31/44* | (2006.01) |
| *A47J 31/36* | (2006.01) |
| *A47J 31/00* | (2006.01) |
| *A47J 31/02* | (2006.01) |

(52) U.S. Cl.
CPC ......... *A47J 31/0626* (2013.01); *A47J 31/005* (2013.01); *A47J 31/02* (2013.01); *A47J 31/0615* (2013.01); *A47J 31/3671* (2013.01); *A47J 31/4403* (2013.01); *A47J 31/4457* (2013.01); *A47J 2203/00* (2013.01)

(58) Field of Classification Search
CPC   A47J 19/00; A47J 31/00; A47J 31/005; A47J 31/02; A47J 31/06; A47J 31/08; A47J 31/18; A47J 31/44; A47G 19/22; A47G 19/2205; A45F 3/16; A45F 3/20; B65D 1/02; B65D 1/40

USPC .............. 99/275, 279–302 R, 323; 215/10; 206/170–191, 218; 220/592.16, 592.17, 220/660–667

See application file for complete search history.

(56) References Cited

U.S. PATENT DOCUMENTS

| | | | | |
|---|---|---|---|---|
| 640,418 | A * | 1/1900 | Royer | A45F 3/20 |
| | | | | 206/218 |
| 1,048,935 | A * | 12/1912 | Brady | B65D 21/086 |
| | | | | 220/8 |

(Continued)

OTHER PUBLICATIONS

International Search Report and Written Opinion for International Application No. PCT/US2015/36995, issued Sep. 21, 2015, Applicant, Palm Coffeemaker LLC (8 pages).

(Continued)

*Primary Examiner* — Michael Laflame, Jr.
(74) *Attorney, Agent, or Firm* — Richards Patent Law P.C.

(57) ABSTRACT

A brewing and filtering device including a collapsible cup including a base and a folding sidewall comprising a plurality of foldable panels, wherein the sidewall includes a first end and a second end with the first end mated to the base and the second end extending from the base and defining a rim, wherein the base, sidewall, and rim define an open cavity, wherein the sidewall is moveable between a first configuration and a second configuration such that, in the first configuration, the panels are in an unfolded configuration locating the rim a first distance away from the base measured along a first axis and, in the second configuration, the panels are folded such that the panels collapse locating the rim a second distance away from the base, and a filter cap that releasably engages the rim, wherein the filter cap includes a filter.

8 Claims, 10 Drawing Sheets

(56) References Cited

U.S. PATENT DOCUMENTS

| | | | |
|---|---|---|---|
| 1,160,011 A | 11/1915 | Swing | |
| 1,687,345 A | 10/1928 | Meyer | |
| 1,833,823 A | 11/1931 | Buckner | |
| 3,120,170 A | 2/1964 | Garte | |
| 3,285,459 A * | 11/1966 | Gahm | A61J 7/0046 |
| | | | 116/308 |
| 4,143,590 A * | 3/1979 | Kasakoff | A47J 31/02 |
| | | | 99/296 |
| 4,867,993 A | 9/1989 | Nordskog et al. | |
| 4,873,100 A | 10/1989 | Dirksing et al. | |
| 5,363,745 A * | 11/1994 | Lin | A47J 31/0636 |
| | | | 220/230 |
| 5,439,128 A * | 8/1995 | Fishman | A45F 3/20 |
| | | | 206/218 |
| 5,806,408 A | 9/1998 | DeBacker et al. | |
| 5,894,786 A | 4/1999 | Miya | |
| 6,103,116 A | 8/2000 | Koslow et al. | |
| 6,666,329 B1 | 12/2003 | Charbonneau | A61J 7/0046 |
| | | | 206/218 |
| D604,120 S * | 11/2009 | Curtin | D7/629 |
| 7,849,784 B2 | 12/2010 | Adler | |
| 7,976,363 B2 * | 7/2011 | Reich | B23Q 11/0046 |
| | | | 451/451 |
| 8,051,766 B1 * | 11/2011 | Yu | A47J 31/20 |
| | | | 220/625 |
| D664,003 S * | 7/2012 | Nagoya | D7/400 |
| 8,556,099 B2 * | 10/2013 | Perlman | A45F 3/20 |
| | | | 206/217 |
| D695,064 S | 12/2013 | Seymour et al. | |
| 8,887,642 B2 * | 11/2014 | Simpson | B62D 65/18 |
| | | | 104/119 |
| 9,016,491 B2 * | 4/2015 | Blum | A47G 19/2205 |
| | | | 220/4.33 |
| 9,044,082 B2 * | 6/2015 | Kusuma | A45F 3/20 |
| 9,221,582 B2 * | 12/2015 | Wheeler | B65D 21/086 |
| 2003/0160055 A1 * | 8/2003 | Stewart-Stand | A45F 3/20 |
| | | | 220/666 |
| 2006/0260471 A1 | 11/2006 | Adler | |
| 2009/0120167 A1 * | 5/2009 | Skipnes | B01L 3/508 |
| | | | 73/52 |
| 2009/0229472 A1 | 9/2009 | Ferrara | |
| 2012/0074143 A1 * | 3/2012 | Lin | A47J 41/0088 |
| | | | 220/259.4 |
| 2012/0104020 A1 | 5/2012 | Cur et al. | |
| 2013/0101715 A1 | 4/2013 | Geissler et al. | |
| 2015/0246299 A1 * | 9/2015 | Matthews | B01D 29/03 |
| | | | 210/767 |
| 2015/0272378 A1 * | 10/2015 | Sands | A47J 31/42 |
| | | | 426/433 |

OTHER PUBLICATIONS

GSI Outdoors Collpasible Java Drip, Retrieved on Jul. 17, 2015, http://www.amazon.com/GSI-Outdoors-79480-Collapsible-Coffee/dp/B002YT2CII/ref=sr_1_4?ie=UTF8&qid=1435159695&sr=8-4&keywords=silicone+coffeemaker.
William Bounds 08296 Sili Gourmet Silicone Collapsible Coffee Filter Holder, Red, Retrieved on Jul. 17, 2015, http://www.amazon.com/William-Bounds-08296-Silicone-Collapsible/dp/B004WHCJCE/ref=sr_1_3?ie=UTF8&qid=1435159695&sr=8-3&keywords=silicone+coffeemaker.
Kuissential SlickDrip—Collapsible Silicone Coffee Dripper, Filter Cone, Retrieved on Jul. 17, 2015, http://www.amazon.com/Kuissential-SlickDrip-Collapsible-Silicone-Dripper/dp/B0051HEFAS/ref=sr_1_2?ie=UTF8&qid=1435159695&sr=8-2&keywords=silicone+coffeemaker.

* cited by examiner

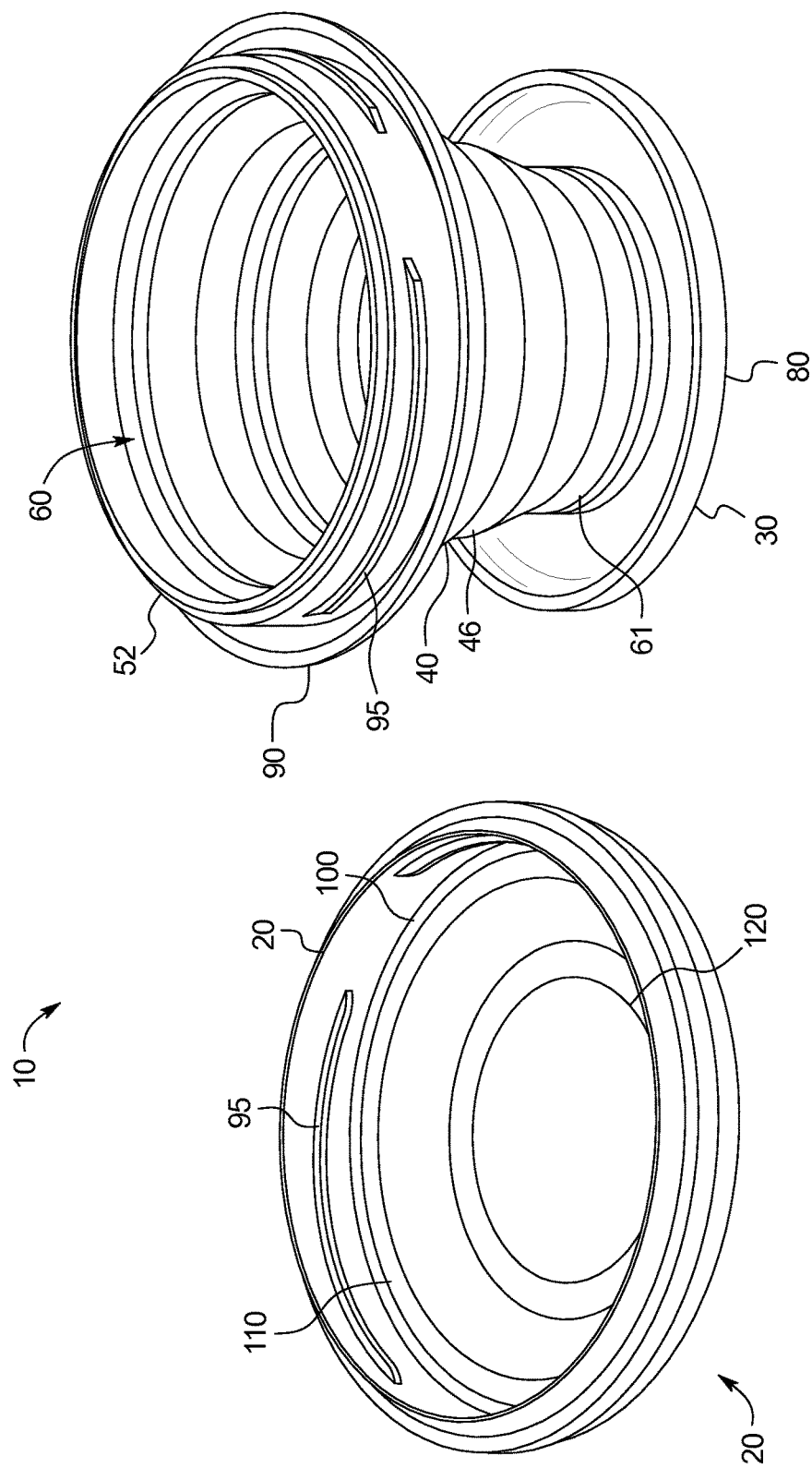

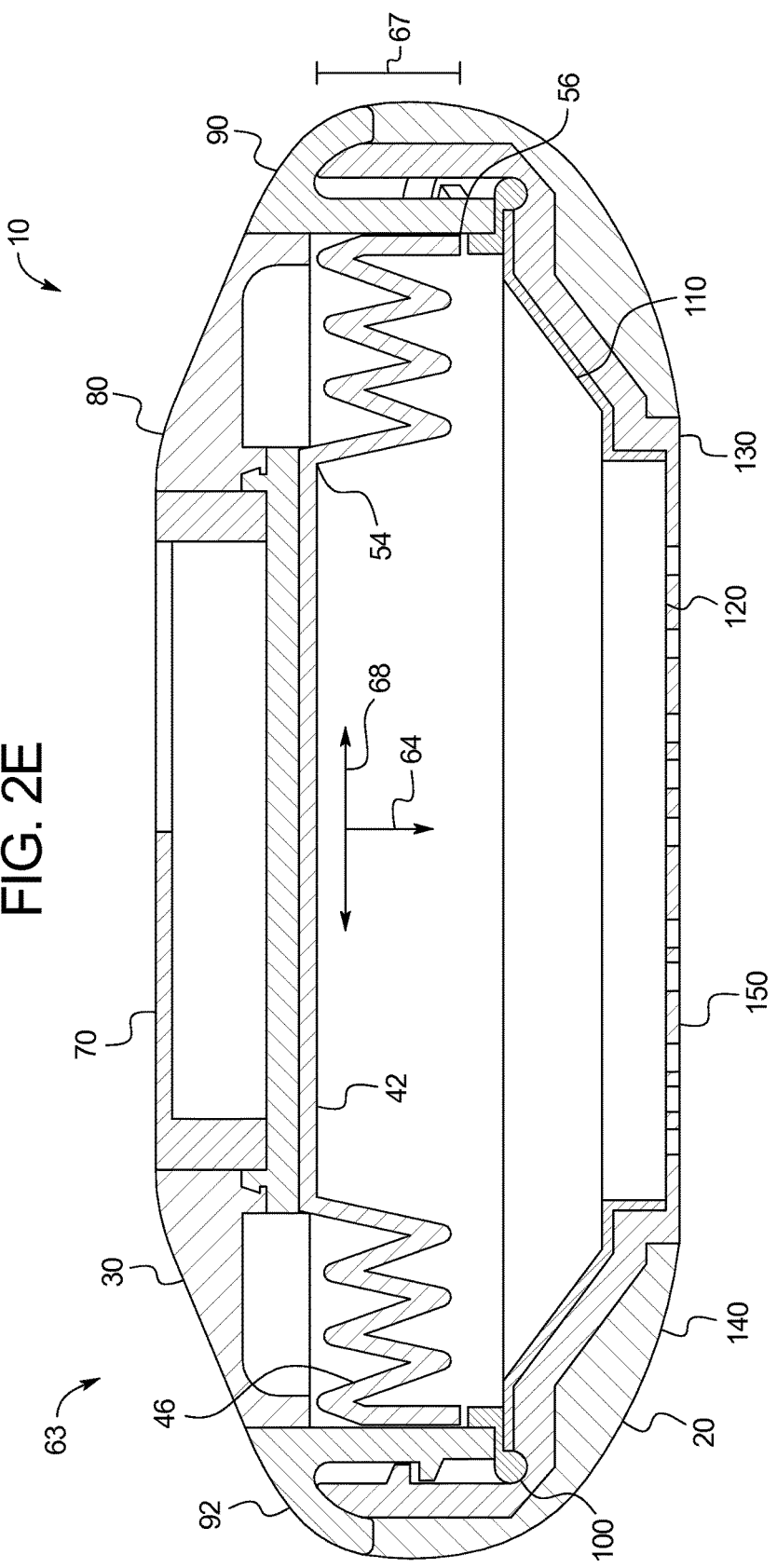

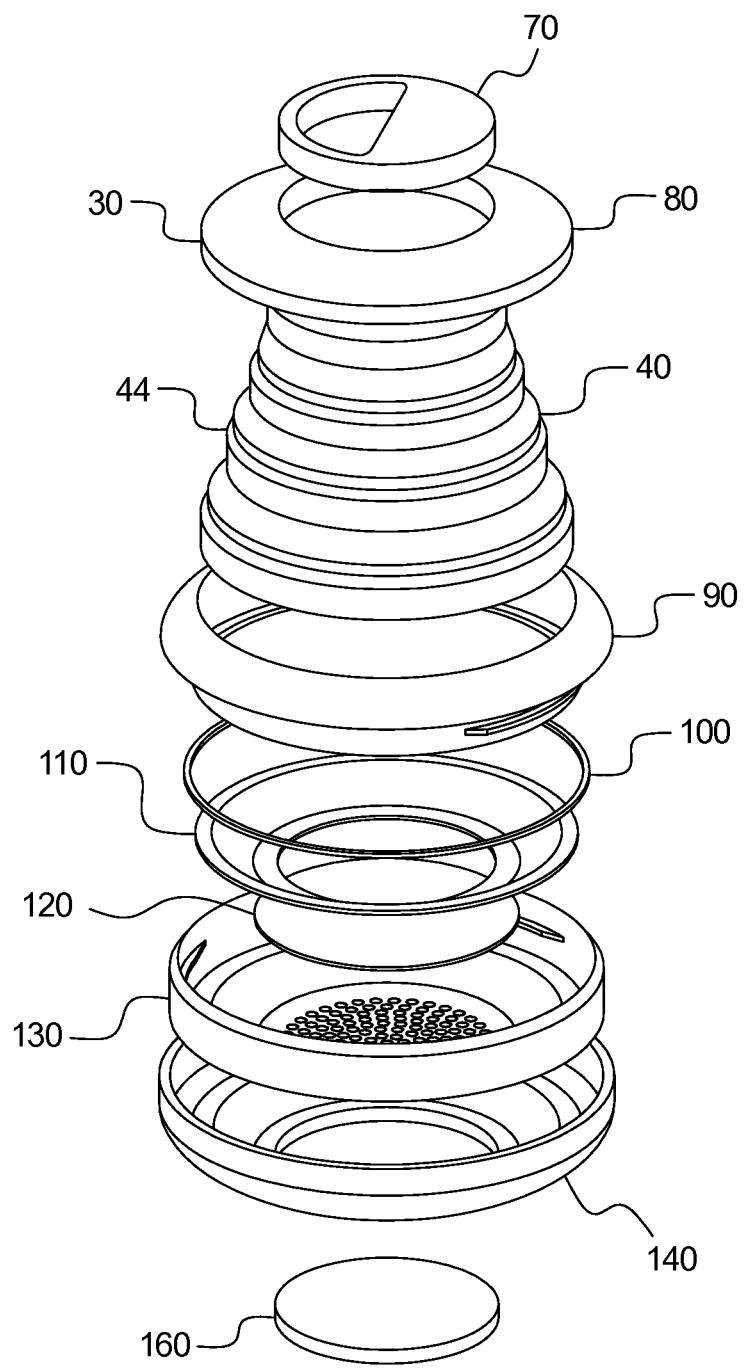

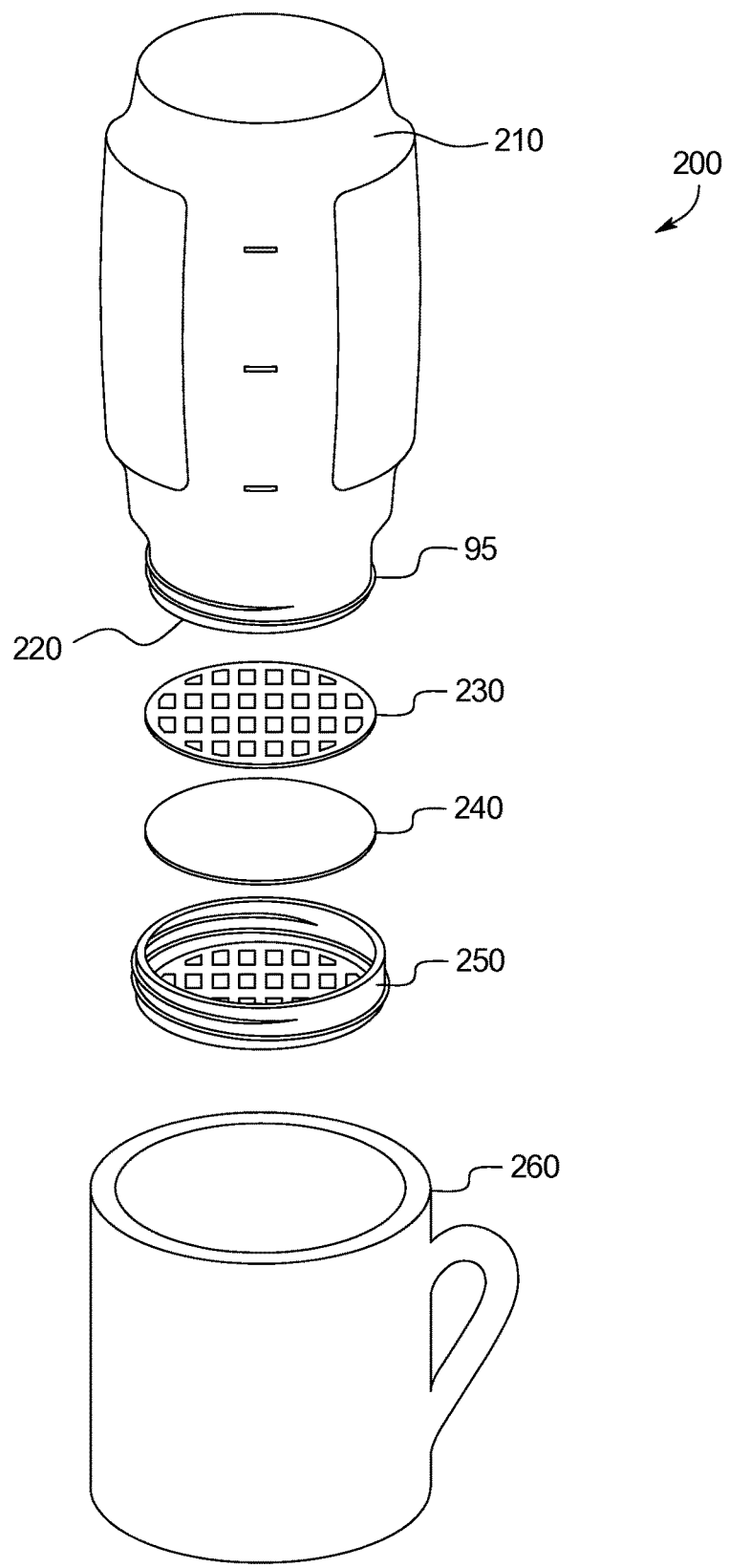

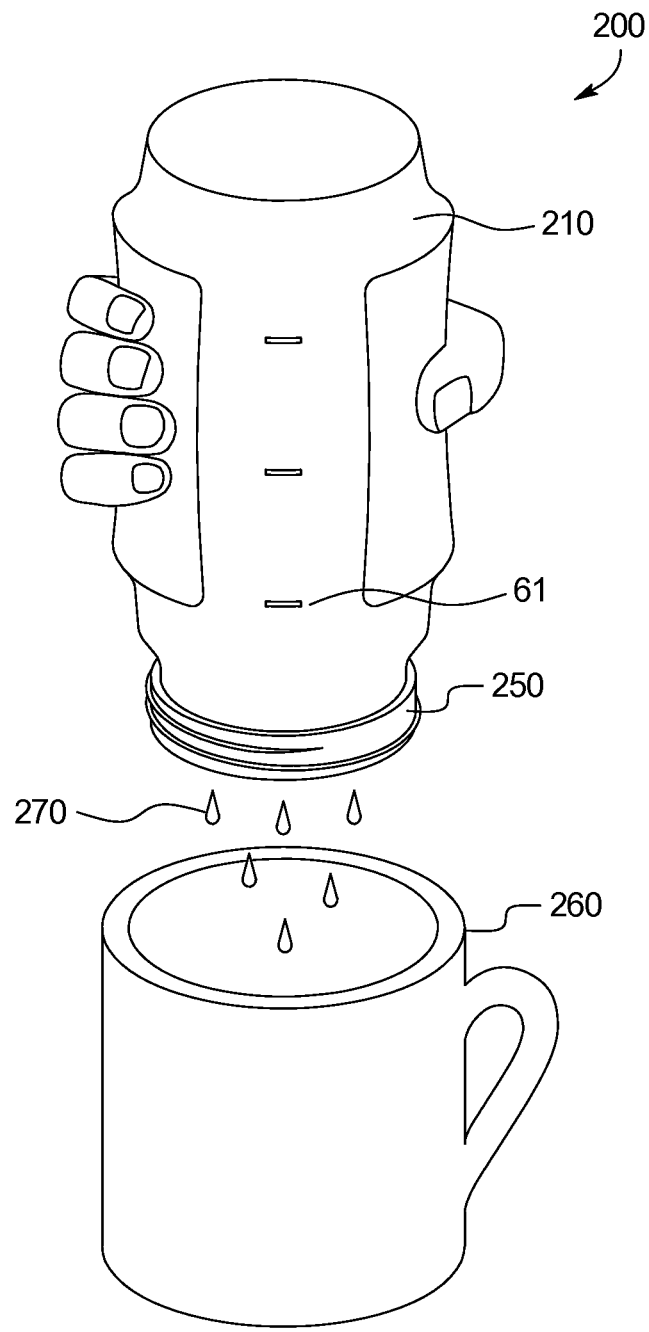

BREWING AND FILTERING DEVICE FOR COFFEE AND TEA

CROSS-REFERENCE TO RELATED APPLICATIONS

This application incorporates by reference and claims the benefit of priority to U.S. Provisional Patent Application No. 62/015,415 filed Jun. 21, 2014.

BACKGROUND OF THE INVENTION

The present subject matter relates generally to beverage makers and filtering devices. More specifically, the present invention relates to manual beverage makers and filtering devices for making and filtering cold or hot brewed coffee or tea.

Coffee and tea are two of the most commonly consumed beverages in the world. A broad assortment of techniques and related devices exist to brew coffee or tea and are chosen by users based upon their specific characteristics including ease of brewing, quantities to be brewed, and taste of the brewed coffee or tea. When brewing single or multiple servings, it is common for users to utilize equipment/methods such as what is commonly referred to as Drip, Siphon/Vacuum, French Press/Press Pot, Single Serve, Pour Over, and Percolator. While these methods are popular within the marketplace, there is room to further improve upon existing designs to provide similar ease of preparation with individual or multiple servings while also improving the ability of the user to vary the type and quantity of ingredients, time allowance, and other variables in accordance with the user's preferences.

Also, previous coffee brewing and filtering devices were often large and bulky. For example, commercially available drip coffee brewing and filtering devices were generally sized to brew a four-cup to twelve-cup pot. The large size of these commercially available drip brewers took up precious space on user countertops. Similarly, previous French press coffee brewing and filtering devices often provided for multiple beverages and took up a considerable amount of space. Thus, there is a need for compact brewing and filtering devices.

For users that only wish to brew a single cup of coffee, traditional brewing methods are overkill. Most commercially available products, like the drip brewing devices and French Press coffee brewing devices, are typically sized for brewing several cups at a time. The large capacity of these devices makes brewing a single cup inefficient. Accordingly, there is a need for a brewing and filtering device that permits a user to efficiently make a single cup of well-brewed coffee or tea.

Another drawback of previously existing coffee and tea brewing and filtering devices is their lack of portability. Increasingly, users would like to make a great cup of coffee or tea when on the go and outside of the home. Many previous devices lack portability in terms of size, simplicity of use, or fragility of material, while disposable or instant coffee devices designed for use during travel often produce coffee or tea that many users find unpleasant. Thus, there is a need for coffee and tea brewing and filtering devices with improved portability.

Accordingly, there is a need for a brewing and filtering device for coffee and tea, as described herein.

BRIEF SUMMARY OF THE INVENTION

To meet the needs described above and others, the present disclosure provides a brewing and filtering device for cold or hot brewed coffee and tea that includes a collapsible cup to permit the user to brew a beverage and press the beverage into a beverage container.

The brewing and filtering device may use an immersion brewing method. This method allows ingredients to be mixed more evenly compared to alternative brewing methods where, for example, water is added to coffee grounds without evenly saturating the grounds. Even saturation of coffee grounds promotes even extraction from the grounds thereby resulting in what many users may consider a better tasting beverage. Additionally, by providing a brewing and filtering device that is simple in construction and reliable in operation, the present invention enables the user to make a single serving or multiple servings of a beverage with simple user effort in the making, filtering, and cleanup processes. And, the brewing and filtering device allows the user to vary the type and amount of ingredients, time allowance, and other variables that affect the result of the beverage according to the user's preferences.

In an embodiment, the brewing and filtering device includes a collapsible cup for receiving the beverage ingredients, such as coffee grounds, tea leaves, and water, and a filter cap for filtering the beverage before consumption. The filter cap may releasably attach to the mouth of the collapsible cup and permit the beverage to exit the collapsible cup only through a filter. To press the beverage out of the brewing and filtering device, the user may press on the base of the collapsible cup to cause a folding sidewall of the collapsible cup to collapse into a folded configuration forcing the beverage through the filter and into a beverage container.

In an embodiment, the collapsible cup may include a base and a folding sidewall comprising a plurality of foldable panels. The folding sidewall may include a first end mated to the base and a second end extending from the base and defining a rim. The base, folding sidewall, and rim define an open chamber (referred to herein as a brewing chamber). To make the cup collapsible, the folding sidewall is moveable between a first configuration and a second configuration. In the first configuration, the foldable panels may be extended in an unfolded configuration locating the rim a first distance away from the base measured along a first axis.

In the second configuration, the foldable panels are folded such that the foldable panels collapse locating the rim a second distance away from the base measured along the first axis shorter than the first distance and locating the foldable panels along a plane perpendicular to the first axis. Also, in an embodiment, the folding sidewall is conical such that the foldable panels increase in diameter from the base to the rim. In an embodiment, the collapsible cup may be made of food-grade silicone. The collapsible cup may be bonded or co-molded with a plunger.

The collapsible cup may include a cup ring bonded or co-molded with the rim of the cup. The cup ring may include threads for receiving the filter cap. In an embodiment, the threads may have a travel of ninety degrees. The filter cap in turn may include threads to attach the filter cap to the cup ring. Additionally, the cup ring may include a surface, wherein, when the collapsible cup is in the second configuration, a first outer surface of the plunger, an outer surface of the filter cap, and the surface define a continuous curving surface.

In an embodiment, the brewing and filtering device includes: a plunger including a plunger base and a pull tab; a collapsible cup including a deformable folding sidewall and a cup ring; a filter cap including a cap ring, non-slip grip, a drip surface, a filter, a diaphragm, and a silicone seal; and a magnetic cover.

The plunger may include a plunger base and a pull tab. The pull tab may permit the user to pull the plunger base to expand the collapsible cup. The pull tab may be die cast (or die stamped, die cut, etc.) stainless steel or other rigid material. The pull tab may include a flat surface flush with a flat portion of the plunger base outer surface to define a stable base for the brewing and filtering device when resting on a surface in use or stored. The plunger may provide a larger surface area than the base of the collapsible cup to provide stability and a graspable edge for a user to hold onto when pressing. Specifically, in an embodiment, the collapsible cup includes a base width, where the base width is perpendicular to the first axis and the plunger including a plunger width, where the plunger width is perpendicular to the first axis. To provide the larger surface area with a graspable edge, the plunger width is greater than the base width.

In an embodiment, a filter cap is provided to filter the beverage before consumption. The filter cap may releasably engage a rim of the collapsible cup. The filter cap may enclose the open cavity of the brewing chamber to restrict a fluid such as coffee or tea to pass out of the brewing chamber only through a filter.

A cap ring of the filter cap may be manufactured from die cast (or die stamped, or die cut, etc.) stainless steel or other rigid material and may define the structure of the filter cap. The cap ring may include a drip surface through which the brewed beverage may drip into a mug or other beverage container. The drip surface may be substantially flat with a lattice of perforated holes to permit the beverage to drip out. A filter may be disposed between the drip surface and the brewing chamber of the collapsible cup in order to filter the beverage during pressing. The filter may be a die-cut or mesh extra fine filter. A diaphragm may secure the filter in contact with the drip surface and may include an aperture that forces the beverage through the filter before flowing through the drip surface. A silicone seal may, in turn, seal the interface between the filter cap and the collapsible cup.

In some embodiments, the brewing and filtering device may further include a magnetic cover. The magnetic cover magnetically attaches to the cap ring and encloses the plurality of holes of the drip surface to prevent the accumulation of dirt and debris within the holes during storage of the brewing and filtering device.

When pressing out the beverage, the filter cap may rest on a mug at the non-slip grip. The non-slip grip may prevent the brewing and filtering device from slipping around or off the mug during pressing. The non-slip grip of the filter cap may be manufactured from TPE or silicone that grips the point of contact with the mug. Additionally, the filter cap and non-slip grip may be curved to slope away from the drip surface to avoid spillage from fluid flow along the non-slip grip.

An object of the invention is to provide a cold or hot brewed coffee and tea brewing and filtering solution with improved compact size relative to previous large and bulky products.

Another object of the invention is to provide a coffee and tea brewing and filtering solution with improved portability to previous products.

Additional object of the invention is to provide a coffee and tea brewing and filtering solution with improvements of less waste over single-serve pod machines and more user control according to user preferences.

The advantages of the invention are that it provides a compact brewing and filtering device for cold or hot brewed coffee and tea with enhanced portability that provides ease of preparation with individual or multiple servings while also improving the ability for a user to control the type and quantity of ingredients, time allowance, and other variables in accordance with the user's preferences.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 2A is a front perspective view of the brewing and filtering device of FIG. 1A illustrating an open brewing configuration with a removed filter cap and extended collapsible cup.

FIG. 2E is a cross-sectional view of the brewing and filtering device of FIG. 1C after pressing.

FIG. 3 is an exploded view of the brewing and filtering device of FIG. 1A.

FIG. 4 illustrates a front exploded perspective view of another example of a brewing and filtering device.

FIG. 5 illustrates a front perspective view of the brewing and filtering device of FIG. 4 held over a mug and being deformed through manual compression.

DETAILED DESCRIPTION OF THE INVENTION

FIGS. 1A-1D illustrate an example brewing and filtering device 10 for brewing and filtering beverages such as coffee and tea. In FIGS. 1A-1D the brewing and filtering device 10 is in a compacted stored configuration that permits a user to easily store the brewing and filtering device 10. The stored configuration provides an attractive profile for the brewing and filtering device 10 when not in use.

Figure 1A:
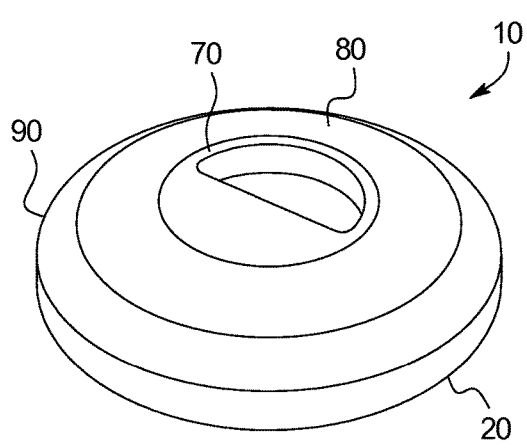
FIG. 1A is a front perspective view illustrating an example brewing and filtering device in a stored configuration.
Figure 1B:
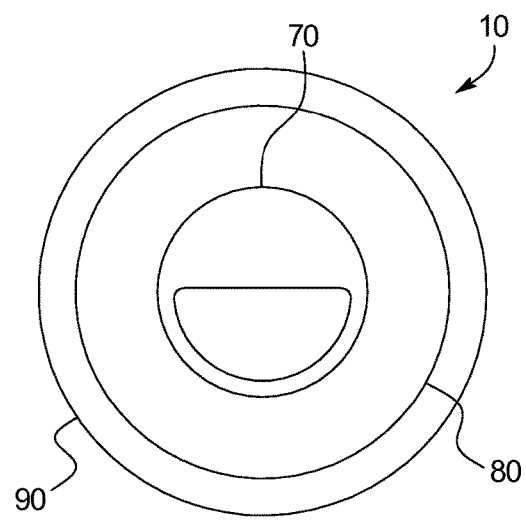
FIG. 1B is a top view of the brewing and filtering device of FIG. 1A.
Figure 1C:
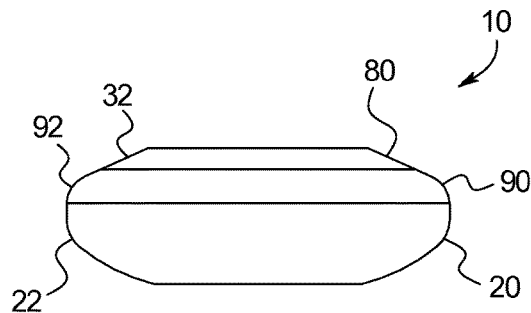
FIG. 1C is a side view of the brewing and filtering device of FIG. 1A.
Figure 1D:
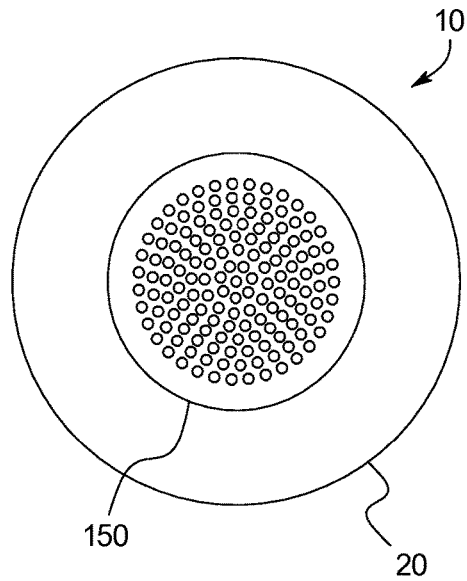
FIG. 1D is a bottom view of the brewing and filtering device of FIG. 1A.
Figure 2B:
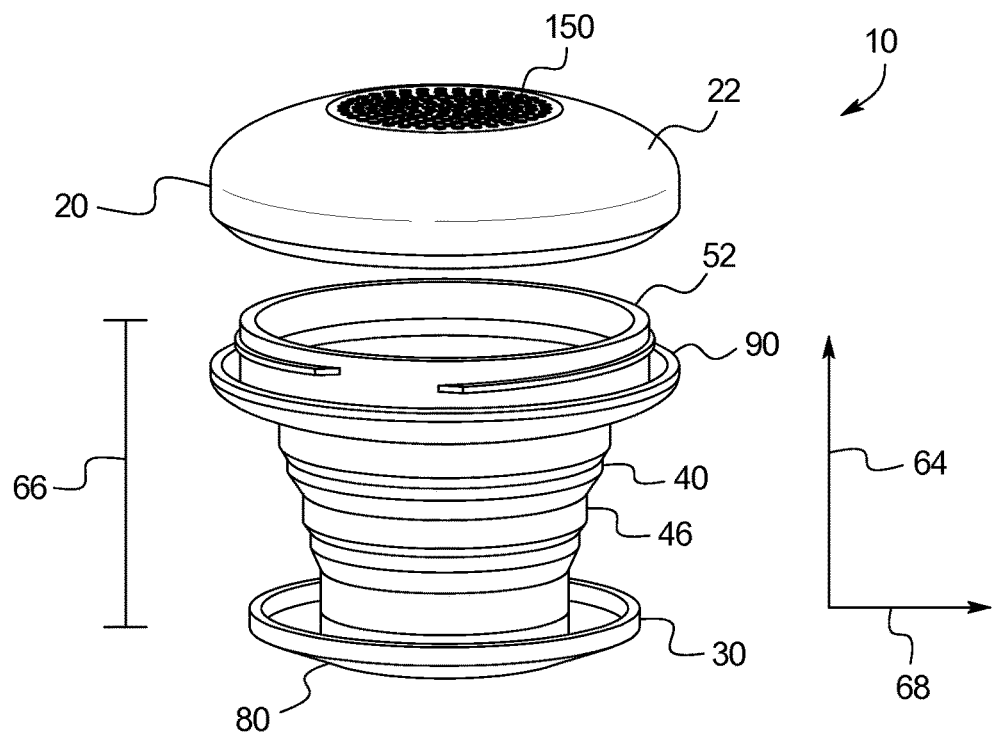
FIG. 2B is a front perspective view of the brewing and filtering device of FIG. 1A illustrating an open brewing configuration with a removed filter cap and extended collapsible cup just before the replacement of the filter cap.

Turning to FIGS. 2A-2E, the brewing and filtering device 10 may be opened to a brewing configuration, as shown in FIG. 2A, from the stored configuration shown in FIGS. 1A-1D. The user may pull on the pull tab 70 to remove the plunger base 30 away from the cup ring 90 and the filter cap 20 and expand the collapsible cup 40 to prepare the brewing chamber 60. The user may remove the filter cap 20 and then add coffee grounds or tea leaves into the brewing chamber 60 and fill with water of a desired temperature. In an embodiment, the collapsible cup 40 includes fill lines 61 to help the user fill the collapsible cup 40 to a desired amount. The filter cap 20 is then screwed back onto the collapsible cup 40. The brewing and filtering device 10 is left to sit for an amount of time according to the user's preference and may then be inverted and placed on the rim of a beverage container. The user may then gently press the plunger 80 forcing out the beverage through a drip surface 150 and into the beverage container. Once the beverage is fully pressed, the user may again expand the collapsible cup 40, unscrew the filter cap 20, and clean the brewing and filtering device 10.

Figure 2C:
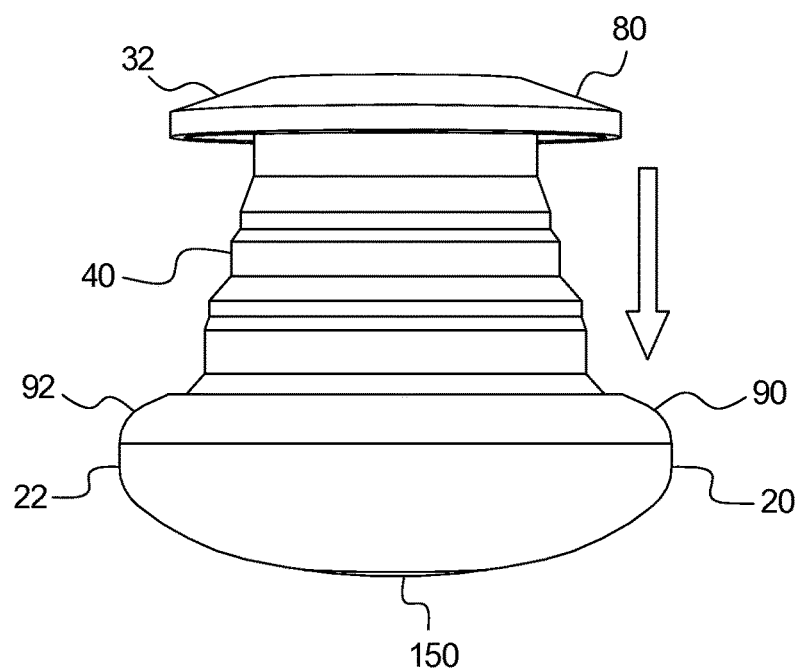
FIG. 2C is a front perspective view of the brewing and filtering device of FIG. 1A illustrating an extended collapsible cup with replacement of the filter cap and prepared for pressing.
Figure 2D:
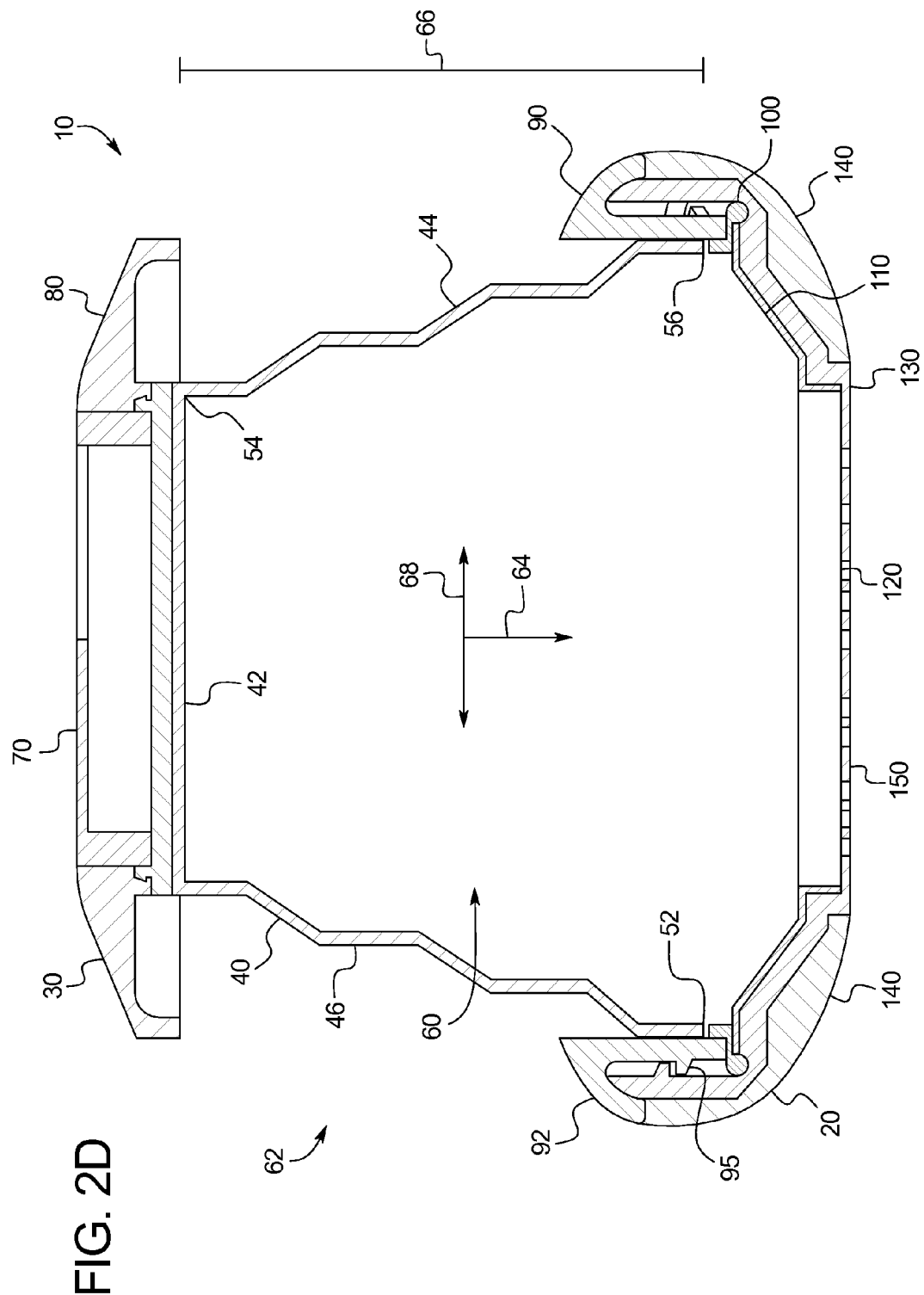
FIG. 2D is a cross-sectional view of the brewing and filtering device of FIG. 2C illustrating an extended collapsible cup with replacement of the filter cap and prepared for pressing.

In an embodiment, the collapsible cup 40 may include a base 42 and a folding sidewall 44 comprising a plurality of foldable panels 46. The folding sidewall 44 may include a first end 54 mated to the base 42 and a second end 56 extending from the base 42 and defining a rim 52. The base 42, folding sidewall 44, and rim 52 define an open chamber (referred to herein as a brewing chamber 60). To make the collapsible cup 40 collapsible, the folding sidewall 44 is moveable between a first configuration 62 and a second configuration 63. In the first configuration 62, shown in FIGS. 2A to 2D, the foldable panels 46 are in an unfolded configuration locating the rim 52 a first distance 66 away from the base 42 measured along a first axis 64. In the second configuration 63, shown in FIGS. 1A-1D and 2E, the foldable panels 46 are folded such that the foldable panels 46 collapse locating the rim 52 a second distance 67 away from the base 42. Measured along the first axis 64, the second distance 67 is shorter than the first distance 66. In the second configuration, the foldable panels 46 are located along a plane 68 perpendicular to the first axis 64. Also, as shown in FIGS. 2A to 2C, the folding sidewall 44 is conical such that the foldable panels 46 increase in diameter from the base 42 to the rim 52. In an embodiment, the collapsible cup 40 may be made of food-grade silicone. The collapsible cup 40 may be bonded or co-molded with the plunger 80.

The collapsible cup 40 may include a cup ring 90 bonded or co-molded with the rim 52 of the collapsible cup 40. The cup ring 90 may include threads 95 for receiving the filter cap 20. In an embodiment, the threads 95 may have a travel of ninety degrees. The filter cap 20 in turn may include threads 95 to attach the filter cap 20 to the cup ring 90. Additionally, to provide an aesthetically pleasing shape, the cup ring 90 may include a surface 92, wherein, when the collapsible cup 40 is in the second configuration 63, a first outer surface 32 of the plunger, an outer surface 22 of the filter cap 20, and the surface 92 define a continuous curving surface. In the embodiment shown, the brewing and filtering device 10 is approximately disc-shaped and the continuously curving surface defines a radially symmetric curved perimeter.

FIG. 3 illustrates an exploded view of the brewing and filtering device 10. As shown, in an embodiment, the brewing and filtering device 10 includes: a plunger 80 including a plunger base 30 and a pull tab 70; a collapsible cup 40 including a deformable folding sidewall 44 and a cup ring 90; a filter cap 20 including a cap ring 130, non-slip grip 140, a filter 120, a diaphragm 110, and silicone seal 100; and a magnetic cover 160.

The plunger 80 may include a plunger base 30 and a pull tab 70. The pull tab 70 may permit the user to pull the plunger base 30 to expand the collapsible cup 40. The pull tab 70 may be die cast (or die stamped, die cut, etc.) stainless steel. The pull tab 70 may include a flat surface flush with a flat portion of the plunger outer surface 32 to define a stable base for the brewing and filtering device 10 when in use and when stored. The plunger 80 may include a larger diameter or provide a larger surface area than the base 42 of the collapsible cup 40 to provide stability when the brewing and filtering device 10 is in use and a graspable edge to hold onto when pressing. Specifically, in an embodiment, the collapsible cup 40 includes a base width, where the base width is perpendicular to the first axis 64 and the plunger 80 includes a plunger width, where the plunger width is perpendicular to the first axis 64. To provide the larger surface area of the plunger 80 with a graspable edge, the plunger width is greater than the base width.

In an embodiment, as shown in FIGS. 1A-1D, 2A-2E, and 3, a filter cap 20 is provided to filter the beverage before consumption. As shown, in FIGS. 2B and 2C, the filter cap 20 releasably engages a rim 52 of the collapsible cup 40 at a cup ring 90. The filter cap 20 encloses the brewing chamber 60 to restrict a fluid, such as coffee or tea, to pass out of the brewing chamber 60 only through the drip surface 150 and/or a filter 120. In some embodiments, the filter 120 may be built into the filter cap 20 in place of the drip surface 150, thus eliminating the need for a separate filter 120, diaphragm 110, and drip surface 150.

A cap ring 130 of the filter cap 20 may be manufactured from die cast stainless steel (or die-cut, mesh, or micro mesh stainless steel) and may define the structure of the filter cap 20. The cap ring 130 may include a drip surface 150 through which the brewed beverage may drip into a mug or other beverage container. The drip surface 150 may be substantially flat with a lattice of perforated holes to permit the beverage to drip out. A filter 120 may be disposed between the drip surface 150 and the brewing chamber 60 of the collapsible cup 40 in order to filter the beverage during pressing. The filter 120 may be a die-cut extra fine or micro mesh filter 120. A diaphragm 110 may secure the filter 120 in contact with the drip surface 150 and may include an aperture that forces the beverage through the filter 120 before flowing through the drip surface 150. A silicone seal 100 may be included to make the brewing and filtering device 10 watertight.

In some embodiments, the brewing and filtering device 10 may further including a magnetic cover 160. The magnetic cover 160 magnetically attaches to the cap ring 130 and encloses the plurality of holes of the drip surface 150 to prevent the accumulation of dirt and debris within the holes during storage of the brewing and filtering device 10.

Figure 7:
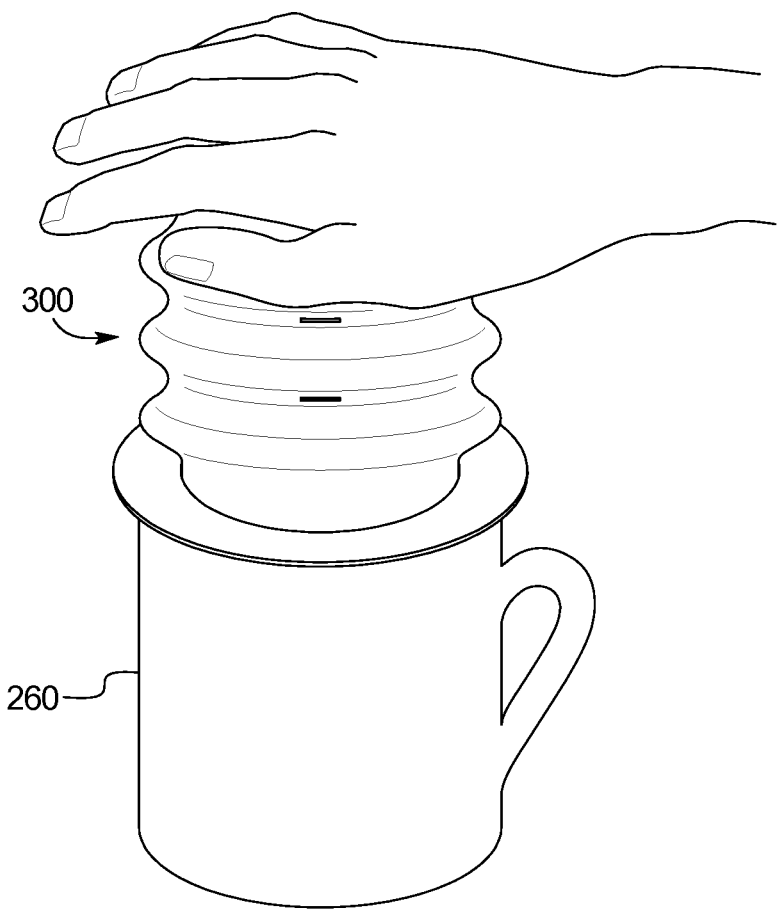
FIG. 7 illustrates a front perspective view of the brewing and filtering device of FIG. 6 resting atop a mug and being deformed through manual compression.

When pressing out the beverage, the filter cap 20 may rest on a mug at the non-slip grip 140 (in a manner similar to the one shown in FIG. 7). The non-slip grip 140 may prevent the brewing and filtering device 10 from moving around or slipping off the mug during pressing. The non-slip grip 140 of the filter cap 20 may be manufactured from TPE or silicone that grips the point of contact with the mug. Additionally, the filter cap 20 and non-slip grip 140 may be curved to slope away from the drip surface 150 to avoid spillage from fluid flow along the non-slip grip 140.

FIG. 4 shows a coffee or tea brewing and filtering device 200 according to a specific embodiment of the invention. The brewing and filtering device 200 includes a hollow deformable chamber 210 including an opening 220. The opening 220 of the hollow deformable chamber 210 includes a screw thread 95. In operation, the opening 220 of the hollow deformable chamber 210 is facing upward. A user may add coffee grounds or tea leaves and water at a desired temperature into the hollow deformable chamber 210. A perforated filter support 230 may then be placed onto the opening 220 of the hollow deformable chamber 210. The perforated filter support 230 holds the coffee or tea filter 240 in place and protects a filter 240 from damage during the filtering process due to strong air pressure. The filter 240 is inserted into a perforated removable cap 250. The perforated removable cap 250 is screwed onto the hollow deformable chamber 210, sealing the opening 220 of the hollow deformable chamber 210. The coffee or tea brewing and filtering device 200 is picked up and gently moved or swirled in order to blend the ingredients inside the hollow deformable chamber 210. The brewing and filtering device 200 may then be picked up and held directly above an open mouth vessel 260 so that the opening 220 of the hollow deformable chamber 210 is facing downward.

FIG. 5 illustrates the hollow deformable chamber 210 being deformed through manual compression. Deforming the hollow deformable chamber 210 pressurizes the air above the liquid 270. The pressurized air forces the liquid 270 in the hollow deformable chamber 210 through the perforated filter support 230, coffee or tea filter 240, and the perforated removable cap 250 into the open mouth vessel 260. Continuous manual compression forces the liquid 270 through the perforated filter support 230, coffee or tea filter 240, and the perforated removable cap 250 until no liquid 270 remains in the hollow deformable chamber 210. Depending on the rigidity or thickness of the walls of the hollow deformable chamber 210, cessation of the manual compression on the hollow deformable chamber 210 may allow the hollow deformable chamber 210 to return toward its resting position. When the desired amount of liquid 270 is expelled, manual compression of the hollow deformable chamber 210 may cease. The brewing and filtering device 200 is lifted off of the open mouth vessel 260 and can be disassembled and cleaned at this time.

Figure 6:
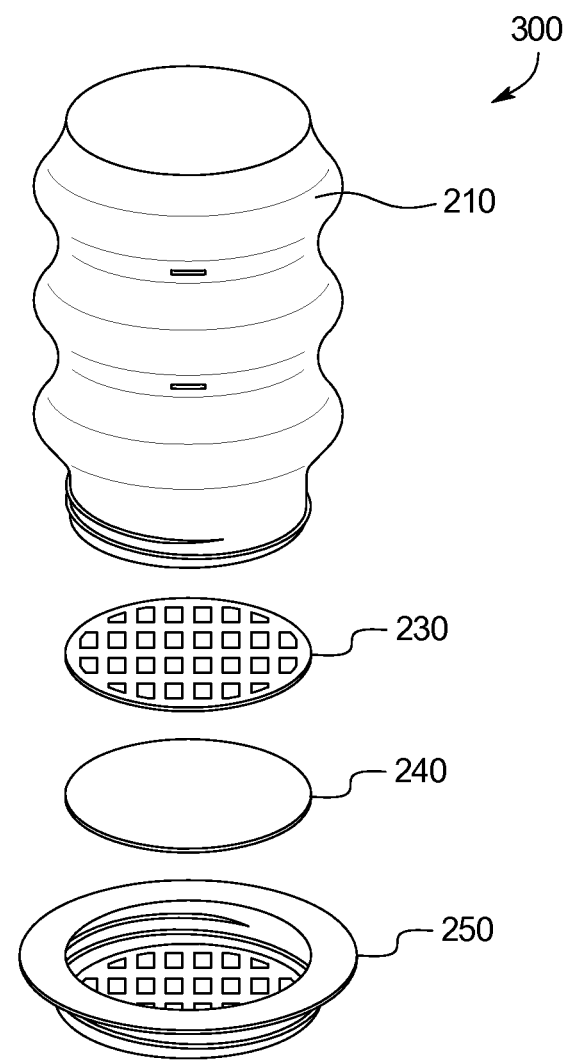
FIG. 6 illustrates a front exploded perspective view of yet another embodiment of the brewing and filtering device, including a hollow deformable chamber taking the form of an accordion or bellows shape and a perforated removable filter cap including a wide rim to allow the brewing and filtering device to rest atop a mug.

FIG. 6 shows the brewing and filtering device 300 according to an alternative embodiment, whereby the hollow deformable chamber 210 takes the form of an accordion or bellows shape with the ability to deform the hollow deformable chamber 210 through a downward pressing motion, and the perforated removable cap 250 is constructed with a wide rim to support the brewing and filtering device 300 above an open mouth vessel 260.

FIG. 7 illustrates the brewing and filtering device 300 depicted in FIG. 6 resting atop an open mouth vessel 260 and being deformed through manual compression through a downward pressing motion. The bellows shape of the deformable chamber 210 causes it to deform in a uniform way while the user applies a force, permitting a stable collapse that resists causing spills (as may occur if the deformable chamber 210 were to collapse in a non-uniform way and knock over the beverage container).

Figure 8:
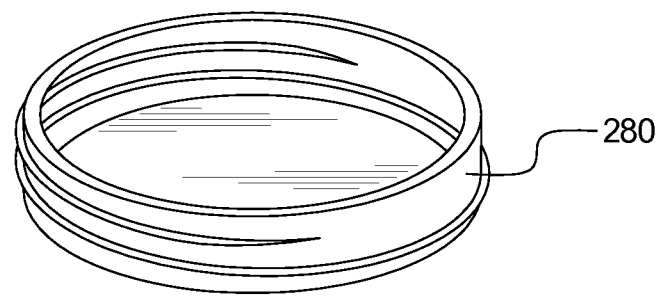
FIG. 8 illustrates a solid removable cap to seal the opening of the hollow deformable chamber of the brewing and filtering device of FIG. 6.

FIG. 8 illustrates an additional component to the brewing and filtering device 200 of a solid cap 280 that may be used in operation of the brewing and filtering device 200 to make cold brewed coffee or tea, as well as to enclose the opening 220 to prevent the accumulation of dirt and debris during storage of the brewing and filtering device 200. In operation to make cold brewed coffee or tea, the opening 220 of the hollow deformable chamber 210 is facing upward. A user may add coffee grounds or tea leaves and water into the hollow deformable chamber 210. The solid cap 280 is screwed onto the hollow deformable chamber 210, sealing the opening 220 of the hollow deformable chamber 210. The brewing and filtering device 200 is picked up and gently moved or swirled in order to blend the ingredients inside the hollow deformable chamber 210. The brewing and filtering device 200 is left to sit for an amount of time according to the user's preference, usually several hours, at room temperature or alternatively in a refrigerator or a similar cooling device. The solid cap 280 is removed from the hollow deformable chamber 210. The perforated filter support 230 is placed onto the opening 220 of the hollow deformable chamber 210. This keeps the coffee or tea filter 240 in place and protects from damage of the coffee or tea filter 240 during the filtering process due to strong air pressure. The coffee or tea filter 240 may then be inserted into a perforated removable cap 250. The perforated removable cap 250 may be screwed onto the hollow deformable chamber 210, sealing the opening 220 of the hollow deformable chamber 210. The brewing and filtering device 200 is picked up and held directly above an open mouth vessel 260 so that the opening 220 of the hollow deformable chamber 210 is facing downward.

The hollow deformable chamber 210 and the collapsible cup 40 may be smooth or textured, and consist of concave or convex areas and designs. The hollow deformable chamber 210 may contain a support near the opening 220 of the hollow deformable chamber 210 in order to hold it atop an open mouth vessel 260. The hollow deformable chamber 210 and the collapsible cup 40 may be tapered, round, cylindrical, rectangular, have unique curves or angles, take the form of an accordion or bellows shape with one or more curves or angles, and/or take on a variety of visual designs.

In more detail, while the bottom (the opposite end relative to the opening 220) of the hollow deformable chamber 210 may take a variety of shapes or designs, in an embodiment, the bottom of the hollow deformable chamber 210 is flat in order for the brewing and filtering device 200 to support itself on a flat surface.

In further detail, while the design and thickness of the walls of the hollow deformable chamber 210 may vary, in an embodiment, the hollow deformable chamber 210 may include thicker walls near the areas where the user's hand(s) will hold and/or deform the hollow deformable chamber 210, and thinner walls elsewhere to allow the user to deform the hollow deformable chamber 210 with simple effort. The hollow deformable chamber 210 may include fill lines 61 on the walls of the hollow deformable chamber 210.

While the hollow deformable chamber 210 and the collapsible cup 40 may be made from a wide range of materials, in some embodiments, the preferred materials are food-grade silicone, silicone, rubber plastic, or plastic that provides a device that is safe for users to make ingestible beverages, as well as enable the hollow deformable chamber 210 to be deformable.

While the hollow deformable chamber 210 and the collapsible cup 40 may be made from a wide range of materials, it is often desirable that the materials be translucent, transparent, or semitransparent to allow the user to observe the volume of ingredients within.

While the material of the perforated removable cap 250, perforated filter support 230, perforated removable cap 250 with a wide rim, solid cap 280, and cup ring 90 may be a wide range of materials, the preferred materials are stainless steel, any other type of metal, plastic, silicone, or rubber plastic that is safe for users to make ingestible beverages.

While a wide range of dimensions, shapes, and designs are feasible, a hollow deformable chamber 210 or a collapsible cup 40 that can contain a liquid volume of 7.25 ounces to 22 ounces has been found to perform very well.

While the perforated removable cap 250 with and without the wide rim may be secured onto the opening 220 of the hollow deformable chamber 210 via a screw thread 95, alternative attachment mechanisms are possible, including but not limited to: a removable cap 250 that snaps onto or fits snugly onto the opening 220 of the hollow deformable chamber 210, a removable cap 250 that is connected to the hollow deformable chamber 210 via a hinge, a twist and lock design, or any other attachment mechanism as will be apparent to those of skill in the art from the examples provided herein. Similarly, the filter cap 20 may be secured to the collapsible cup 40 via a snap connection, snug fit connection, hinge connection, twist and lock design, or any other attachment mechanism as will be apparent to those of skill in the art from the examples provided herein.

An alternative embodiment of the perforated removable cap 250, the wide rim perforated removable cap 250, and solid cap 280 may include one that resembles the lid of the commonly used mason-style jar, whereby there is a flat solid cap 280 or perforated removable support 230 that fits within a ring band to function as a cap and seal the opening 220 of the hollow deformable chamber 210.

As metal coffee or tea filters 240 are commonly used in the marketplace today, an alternative to the perforated removable cap 250 is a removable cap 250 with a built-in metal coffee or tea filter 240, for example, a metal coffee or tea filter 240 that fits within the perforated removable cap 250.

The brewing and filtering device 10, the brewing and filtering device 200, and the brewing and the filtering device 300 may be used as drinking apparatuses or cups, containers for microwaving food or liquids, and/or various types of filtering and sifting needs. The brewing and filtering device 10, the brewing and filtering device 200, and the brewing and filtering device 300 are portable and exceedingly easy to transport. The brewing and filtering device 200, and the brewing and filtering device 300 are sealable, allowing for the storage of dry or liquid items. Additionally, each component of the brewing and filtering device 10, the brewing and filtering device 200, and the brewing and filtering device 300 may be dishwasher safe, freezer safe, refrigerator safe, oven safe, safe to come in contact with boiling liquid, and/or microwave safe.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A brewing and filtering device comprising:
    a collapsible cup including a base and a folding sidewall comprising a plurality of foldable panels, wherein the sidewall includes a first end and a second end with the first end mated to the base and the second end extending from the base and defining a rim, wherein the base, sidewall, and rim define an open cavity, wherein the sidewall is moveable between a first configuration and a second configuration such that, in the first configuration, the panels are in an unfolded configuration locating the rim a first distance away from the base measured along a first axis and, in the second configuration, the panels are folded such that the panels collapse locating the rim a second distance away from the base measured along the first axis shorter than the first distance and locating the panels along a plane perpendicular to the first axis;
    a plunger secured to the base of the cup;
    a cup ring including an annular portion and an outer surface that extends outwardly from the annular portion, wherein the annular portion of the cup ring surrounds a portion of the sidewall of the cup adjacent the rim and includes a first set of threads; and
    a filter cap that includes a filter on a base portion and a second set of threads on an inner surface of an annular portion extending from the base portion, wherein the filter cap encloses the open cavity to permit a fluid to pass out of the cavity only through the filter;
    wherein the first set of threads of the cup ring engages the second set of threads of the filter cap; and
    wherein, in the second configuration, the plunger is positioned within the cup ring and the cup ring is positioned within the filter cap.

2. The brewing and filtering device of claim 1, wherein the sidewall is conical, wherein the panels increase in diameter from the base to the rim.

3. The brewing and filtering device of claim 1, wherein the plunger includes a pull tab.

4. The brewing and filtering device of claim 1, wherein the cup includes a base width perpendicular to the first axis and the plunger includes a plunger width perpendicular to the first axis, wherein the plunger width is greater than the base width.

5. The brewing and filtering device of claim 1, wherein the cup ring includes a surface, wherein, when the cup is in the second configuration, a first outer surface of the plunger, a second outer surface of the filter cap, and the surface define a continuous curving surface.

6. The brewing and filtering device of claim 1, wherein the filter cap includes a drip surface, and wherein the filter is secured to the drip surface with a diaphragm.

7. The brewing and filtering device of claim 6, further including a magnetic cover, wherein, when the cover is magnetically attached to the drip surface, the cover encloses the plurality of holes.

8. The brewing and filtering device of claim 1, wherein the annular portion of the cup ring is positioned within the filter cap.

* * * * *